United States Patent [19]

Cyfka

[11] 4,273,468
[45] Jun. 16, 1981

[54] TUNNELLING SHIELDS AND LIKE MOVEABLE APPARATUS

[75] Inventor: Tadeusz R. Cyfka, London, England

[73] Assignee: Balfour Beatty Limited, Surrey, England

[21] Appl. No.: 889,242

[22] Filed: Mar. 23, 1978

[51] Int. Cl.³ .............................................. E21D 9/00
[52] U.S. Cl. ........................................ 405/132; 291/1; 405/14; 250/215; 356/153
[58] Field of Search ............... 405/132, 138, 141, 143; 299/31, 1, 56; 250/215, 203, 236, 217; 356/153; 37/156; 172/4.5, 2

[56] References Cited

U.S. PATENT DOCUMENTS

| | | | |
|---|---|---|---|
| 3,321,248 | 5/1967 | Williamson et al. | 299/1 |
| 3,482,103 | 12/1969 | Martinsen | 299/1 X |
| 3,517,966 | 6/1970 | Montacie | 299/1 |
| 3,560,753 | 2/1971 | Beug | 299/1 |
| 3,604,512 | 9/1971 | Carter | 299/1 X |
| 3,706,284 | 12/1972 | Plasser et al. | 299/1 X |
| 3,707,330 | 12/1972 | Pine | 299/1 X |
| 3,857,449 | 12/1974 | Kimura | 299/1 X |
| 4,027,210 | 5/1977 | Weber | 299/1 X |

FOREIGN PATENT DOCUMENTS

1497544  1/1978  United Kingdom .................... 405/132

*Primary Examiner*—Dennis L. Taylor
*Attorney, Agent, or Firm*—Buell, Blenko, Ziesenheim & Beck

[57] ABSTRACT

Corrections to be applied to the motion of a tunnelling shield to maintain or restore motion of the shield along a predetermined path are determined by directing a beam of collimated light in a direction parallel to or at a fixed angle with the axis of said predetermined path; focussing the beam on to the input end of an optical cable carried by the shield and comprising a plurality of optical fibres, the input ends of the fibres being arranged in an array in which the position of the input end of each guide relative to that of another is fixed; and displaying light transmitted through the optical cable or guides on to a screen at which the output ends of the guides are so arranged as to facilitate ready determination of any correction required to be applied to the motion of the shield. The method may be employed to indicate which propulsion rams of a tunnelling shield should be operated to apply the necessary correction to the motion of the shield.

22 Claims, 12 Drawing Figures

Fig. 3. INPUT END MATRIX

$$\frac{R}{r} = \frac{XY}{YZ}$$

TUNNELLING SHIELDS AND LIKE MOVEABLE APPARATUS

This invention relates to the determination of corrections to be applied to the motion of a movable apparatus to maintain or restore motion of the apparatus along a predetermined path. The invention is especially, but not exclusively, concerned with guiding a tunnelling shield and will be described in that context.

It is the practice in tunnelling to use a cylindrical shield which is advanced stepwise by hydraulic rams spaced around its periphery and reacting either upon a cylindrical body advancing behind the cylindrical shield or upon the lining of a completed tunnel section. Earth or other matter is removed from the front of the shield and during and/or after advance of the shield a fresh lining section is formed directly behind it. After each step, the rams are retracted in preparation for the following step. Usually the translational position of the shield is determined after each step and the course corrected, when necessary, by omitting operation of a selected ram or rams on the next step. The advance per step may, for example, be around 600-700 mm, and quite substantial errors can therefore arise in a single step if the ground is non-uniform, and if a correction is significantly wrong, either because of a further non-uniformity in the ground or because of human error, there is a real risk that an unacceptable sudden change may result, especially on small-clearance railway systems; in London Transport "tube" train tunnels, for example, a maximum transverse deviation of the position of the tunnel is ±1 inch (25 mm). There is therefore a need for a practical technique that permits corrections to be applied or varied during the advancing step as soon as an appreciable change in the angular position of the shield occurs and if possible before the resultant translation error becomes material. In continuously-acting optical apparatus hitherto proposed for the determination of corrections to be applied to the motion of a movable apparatus, a considerable path length of a beam of collimated light within the movable apparatus is required, in practice requiring multiple reflection with a consequently increased risk of error due to accidental displacement of a reflector.

It is an object of the present invention to provide an improved method of determining corrections to be applied to the motion of a tunnelling shield or other movable apparatus, (all such movable apparatus, for convenience, hereinafter being included in the term "tunnelling shield") to maintain or restore motion of the shield along a predetermined path, which method is simple and inexpensive to operate and which requires the use of no moving parts.

According to the invention the method comprises directing a beam of collimated light, preferably a laser beam, along, or in a direction parallel to or at a fixed angle with, the axis of the predetermined path of the tunnelling shield, focussing said beam on to the input of one or each of more than one of a group of optical guides carried by the shield, the input ends of said optical guides being arranged in an array in which the position of the input end of each optical guide relative to that of another is fixed; and displaying light transmitted through the optical guide or said optical guides on to a screen or other device at which the ends of the optical guides are so arranged as to facilitate ready determination of any correction required to be applied to the motion of the tunnelling shield to maintain or restore motion of the shield along said predetermined path.

The output ends of the optical guides at the screen or other device may be so arranged as to facilitate ready identification of a particular ram or rams or other propulsion means of the shield to be and/or not to be operated or they may be so arranged as to form a magnification of the array of the input ends.

Where, as is preferred, the output ends of the optical guides are so arranged at the display screen as to facilitate identification of a particular ram or rams or other propulsion means of the tunnelling shield that should and/or should not be operated to maintain or restore motion of the shield along the predetermined path, preferably separate sub-groups of output ends of optical guides are mutually spaced in an array so that each sub-group is identified to correspond to a particular ram or particular rams. Should the beam of collimated light focussed on the input ends of some of the optical guides deviate so that some of these optical guides no longer transmit light and other optical guides that were not transmitting light now do so, then an operative scanning the display screen will be informed by the sub-groups of the output ends of the optical guides now transmitting light to the screen, which ram or rams should be operated in the next step in the advance of the shield, and by the sub-groups of output ends of the optical guides not transmitting light to the screen, which ram or rams should not be operated in the next step in the advance of the shield.

Where the output ends of the optical guides are so arranged at the display screen or other device as to form a magnification of the array of the input ends, preferably the group of optical guides is so arranged that the axis of the beam of collimated light entering the input ends of the group constitutes a datum and any correction required to be applied to the motion of the tunnelling shield is determined by an operative from the direction and extent the light transmitted to the display screen has deviated from the corresponding datum of the magnified array of the output ends. In this case the input ends of the group of optical guides are preferably arranged in the form of a matrix comprising two sets of rows of input ends, the rows of one set being perpendicular to the rows of another set and in the preferred arrangement one set of two sets of rows extends horizontally with the datum lying at the centre or approximate centre of the matrix. Thus, though the direction and extent of deviation of the beam of collimated light from the datum of the matrix of the input ends will not be discernible, by magnification of this deviation on the display screen at the magnified matrix at the output ends, say by a magnification factor of 5, an operative can readily determine the direction and extent of the deviation and can effect an appropriate correction in the motion of the tunnelling shield by omitting or effecting operation of a selected ram or selected rams or other means of propelling the shield at the next step in the advance of the shield.

Operation of the rams at each step in the advance of the shield may be effected manually or may be effected automatically from signals initiated by the optical guides transmitting light to the display screen.

As already indicated the beam of collimated light is preferably a laser beam and in the preferred embodiment the laser beam is directed in a direction parallel to the axis of the predetermined path of the tunnelling shield, the beam being as high as possible in the In addition to determining corrections to be applied to the motion of a tunnelling shield or other movable apparatus to maintain or restore motion of the shield along a predetermined path, it is preferred to monitor also the direction of motion of the tunnelling shield at intervals during advance of the shield for off-line and off-level movement of the shield in a direction parallel to the predetermined path. Preferably, monitoring for such off-line and off-level movement of the shield is effected by causing the beam of collimated light to impinge upon a plurality of optical devices which are arranged in such an array as to detect any off-line and/or off-level movement of the shield and which are connected through an appropriate circuit or appropriate circuits to an indicating instrument or indicating instruments from which an operative can assess the extent of off-line and/or off-level movement of the shield and can effect transverse displacement of the input end of the group of optical guides to compensate for said off-line and/or off-level movement.

For this purpose an appropriate array of optical devices may be positioned in the path of the beam of collimated light, but it is preferred to deflect the beam at periodic intervals on to an appropriate array of optical devices. In both cases, the optical devices may be the input ends of optical guides but preferably they are phototransistors.

The invention further includes a tunnelling shield as hereinbefore defined on which is mounted apparatus for determining corrections to be applied to the motion of the tunnelling shield by the method hereinbefore described to maintain or restore motion of the shield along a predetermined path.

It will be appreciated that since the apparatus for carrying out the method of the present invention is carried by the tunnelling shield, roll of the tunnelling shield about its axis may be such that the apparatus also rolls about the axis of the shield to such an extent that the collimated light impinging on the input end of the group of optical guides apparently moves through the same angular displacement. Accordingly, it is preferred to provide for compensation for roll of the tunnelling shield and one method of doing this is to monitor for roll of the shield and correct the position of the apparatus so that no such apparent angular deflection of the beam occurs by moving the apparatus with respect to, and about the axis of, the shield an appropriate angle in the opposite direction, for example along curved rails carried by the shield. It is preferred, however, to mount the apparatus rigidly on the tunnelling shield and to provide for compensation for roll of the shield by directing the beam of collimated light on to the input end of the group of optical guides by means of an extensible periscope whose inlet end lies on the axis of the beam, and which can be rotatably adjusted about the axis of its outlet end, the arrangement being such that when the tunnelling shield rolls in one direction, the periscope can be adjustably rotated about the axis of its outlet end in the opposite direction to such an extent that the axes of the inlet end of the periscope and of the beam of collimated light continue to coincide.

The invention will now be described in more detail, and by way of example, with reference to the accompanying drawings, in which.

Figure 1:
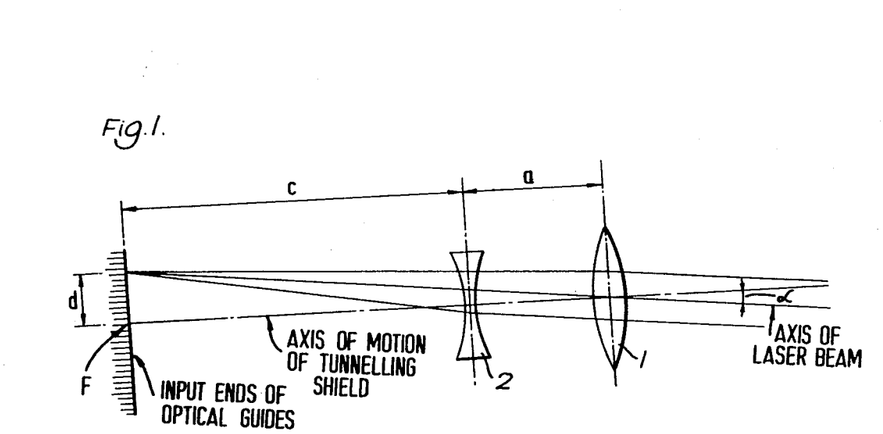
FIG. 1 is a diagrammatic representation of the preferred lens system employed in the method of the invention.

Referring to FIG. 1, in preferred forms of the method and apparatus of the present invention, a laser beam is focussed on to the input ends of optical guides by a lens system comprising a lens 1 having opposed convex faces and a lens 2 having two concave faces because the combination of such lenses will give an equivalent focal length f greater than the actual physical distance between lens 1 and the focal point F. The magnitude of the transverse displacement d of a focussed spot at the focal point F is given by the formula:

$$d = f \tan \alpha \ldots \quad (1)$$

where $\alpha$ is the angle between the axis of the laser beam and the axis of the tunnelling shield.

In the lens system shown in FIG. 1

$$\frac{1}{f_1} + \frac{1}{f_2} - \frac{a}{f_1 f_2} = \frac{1}{f} \quad (2)$$

where $f_1$ is the focal length of lens 1, $f_2$ is the focal length of lens 2 and "a" is the distance between lens 1 and lens 2.

Thus, for example, where $f_1 = +135$ mm, $f_2 = -40$ mm and $a = 11.7$ mm, then from formula (2) f is found to be 1145.5 mm. For an angular displacement of 0° 5', from formula (1) the displacement d of a focussed spot at the focal point F is 1.72 mm.

Figure 2:
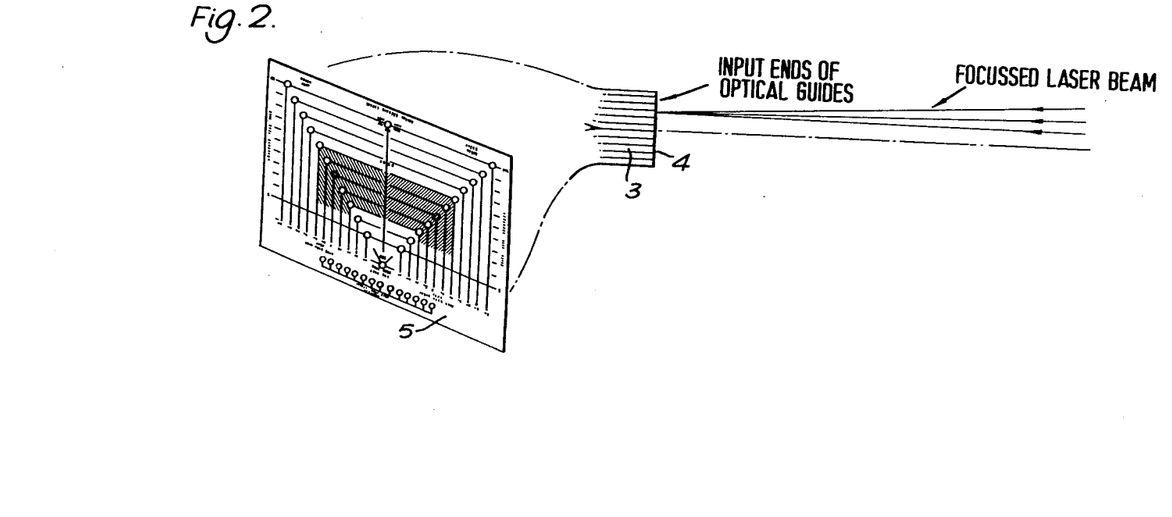
FIG. 2 is a diagrammatic representation of one form of apparatus for use in determining corrections to be applied to the motion of a tunnelling shield to maintain or restore its motion along a predetermined path.

The apparatus shown in FIG. 2 comprises a laser (not shown) and a lens system (not shown) similar to that shown in FIG. 1 which focusses the laser beam on to the input end of an optical cable 3 consisting of 992 optical fibres. The relative positions of the input end of the optical cable 3 and the lens system in a direction parallel to the axis of the beam are adjustable to provide for adjustment of the cross-sectional area of the beam on the input ends 4 of the optical fibres of the cable. The corresponding output ends of the optical fibres are connected to a display screen 5.

Figure 3:
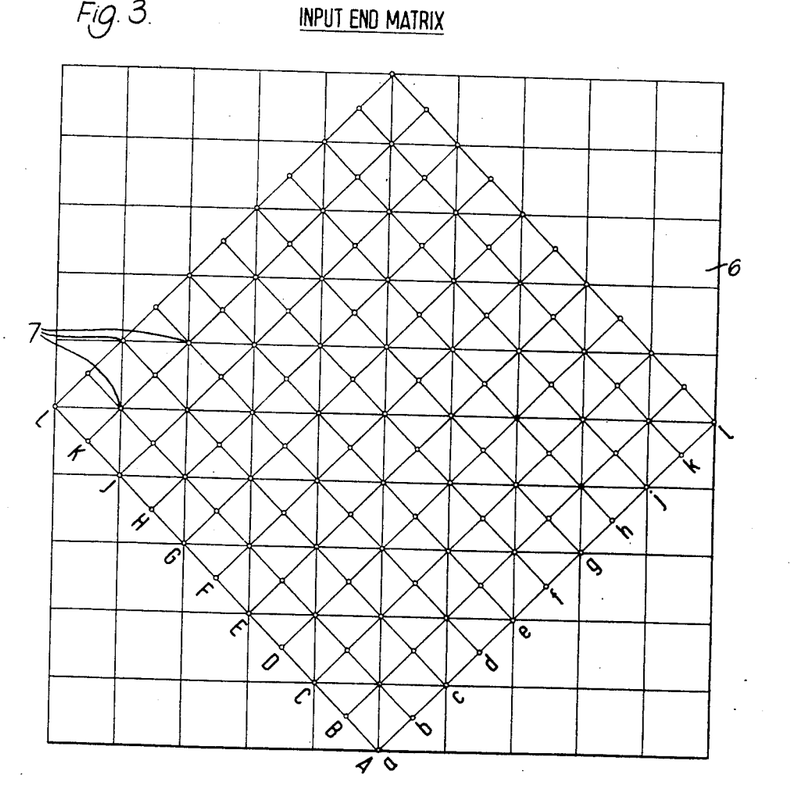
FIG. 3 is a diagrammatic representation of the input end matrix of the group of optical guides of the apparatus shown in FIG. 2, drawn an enlarged scale.

Referring to FIG. 3, the input ends of optical fibres of the cable 3 are sealed in mutually spaced apertures 7 in a plastics disc 6, hereinafter referred to as the input end matrix. The input end matrix has one hundred and twenty-one apertures 7 arranged in eleven equally spaced rows, each of eleven apertures, to form a square whose side edges are inclined at 45° to a horizontal plane. The distance between the diagonally opposite corners of the square is 25 mm. Each aperture 7 has a diameter of approximately 1 mm and the centre-to-centre spacing between apertures in each row of eleven apertures is approximately 1.77 mm. Except for the three lowermost apertures and the three uppermost apertures, each of the apertures 7 has the input end of a bunch of eight optical fibres secured in the apertures by an adhesive resin; the lowermost three apertures and the uppermost three apertures each has the input end of a bunch of twelve optical fibres secured in it, the additional optical fibres in the lowermost three apertures and uppermost three apertures being for a purpose that will hereinafter be explained. As will be seen, each of the rows of eleven apertures is labelled with a letter so that reference to any aperture can be made by reference to each of the rows in which it lies. Thus, the lowermost aperture is aperture (A,$a$) and the uppermost aperture is aperture (L,$l$).

Figure 4:
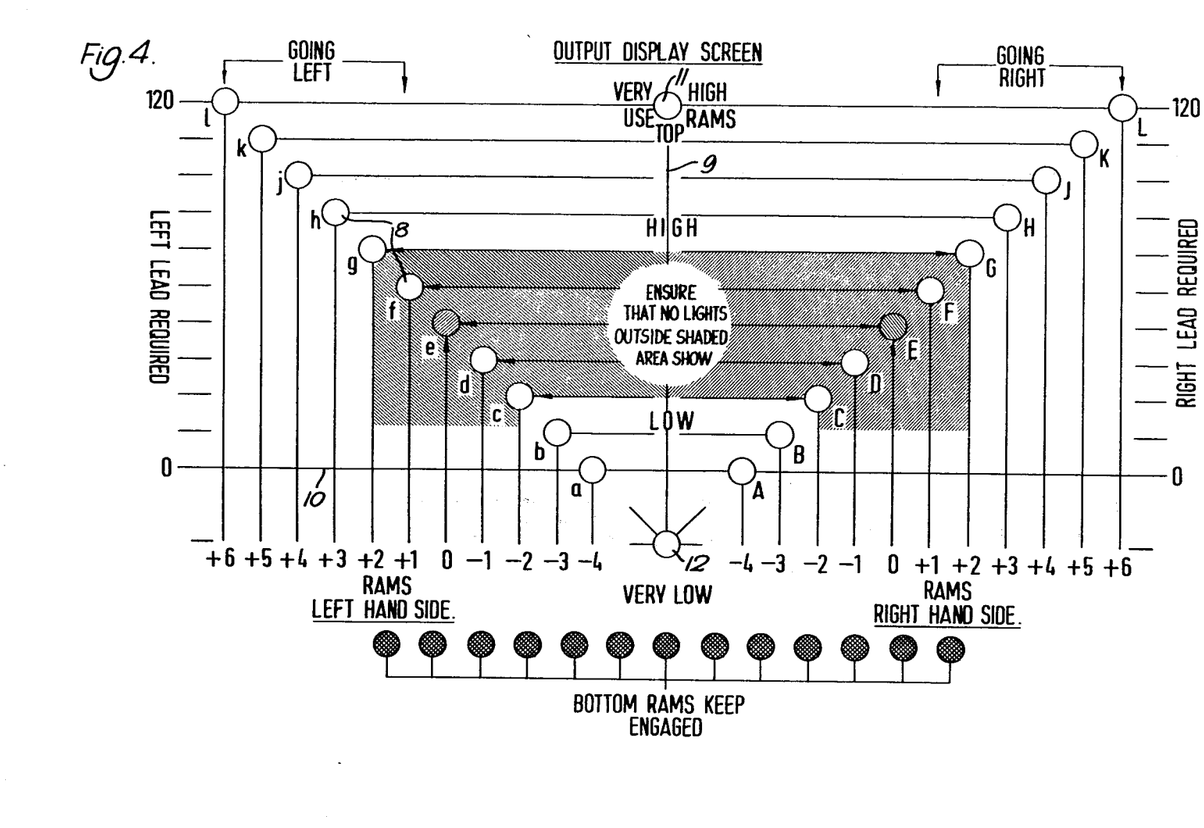
FIG. 4 is a diagrammatic representation of the display screen of the apparatus shown in FIG. 2.

The display screen 5 diagrammatically represented in FIG. 4 comprises a sheet of plastics material having an array of mutually spaced holes 8 in each of which the output end of a sub-group of optical fibres is secured by an adhesive resin. The array of holes 8 includes two rows each of eleven holes arranged on opposite sides of a vertical axis 9 and each inclined at an angle of 45° to a horizontal axis 10, with the lowermost hole of each row lying on said horizontal axis. The holes 8 on the left-hand side of the screen 5 are labelled a to l and correspond with rows a to l of the input end matrix 4 and the holes 8 on the right-hand side of the screen are labelled A to L and correspond with rows A to L of the input end matrix. As will be seen, adjacent holes 8 of both rows are spaced the same distance apart so that each pair of holes (say, holes E,$e$) lies on a line parallel to the horizontal axis 10. The array of holes also includes a hole 11 lying on the vertical axis 9 and on the horizontal axis of the uppermost holes of the two rows and a hole 12 which also lies on the vertical axis at a position below the horizontal axis 10 at the point of intersection of the inclined axes of the two rows. The plastics sheet of the display screen 5 is of substantially rectangular shape having a width of 230 mm and a height of 150 mm, and the centre-to-centre spacing between adjacent holes of each row is 12 mm. The centre-to-centre spacing between hole 12 and the lowermost holes of the two rows is 24 mm. As will be seen, the vertical axes on which the holes of each row lie, starting from the central vertical axis 9, are labelled from $-4$ through 0 to $+6$ and each horizontal axis on which pairs of holes lie is labelled from 0 to 120 in steps of 12. The display screen 5 also carries the legend as indicated.

The output ends of any four optical fibres from each of the eleven holes lying in row E of the input end matrix (FIG. 3), a total of forty-four fibres in all, are secured by an adhesive resin in the hole E lying on the axis 0 on the right-hand side of the display screen 5, and the output ends of any four fibres from each of the eleven holes lying in row e of the input end matrix are similarly secured in the hole e lying on the axis 0 on the left-hand side of the display screen 5. The output ends of any four fibres from each of the eleven holes lying in rows A-D and F-L of the input end of the matrix 4 are secured in the hole of the holes A-D and F-L that lies on the corresponding axis of the axes $-4$ to $+6$ on the right-hand side of the display screen 5 and the output ends of any four fibres from each of the eleven holes lying in rows a-d and f-l of the input end matrix are secured in the hole of the holes a-d and f-l that lies on the corresponding axis of the axes $-4$ to $+6$ on the left-hand side of the display screen. Thus, each hole 8 of both inclined rows of holes in the display screen 5 has secured in it the output ends of forty-four optical fibres. The output ends of the remaining twelve fibres of apertures (A,$a$) (B,$a$) and (A,$b$) of the input end matrix 4 are secured in the hole 12. The hole 11 has secured in it the output ends of the remaining twelve fibres of apertures (L,$l$), (L,$k$) and (K,$l$).

The input end matrix 4 and the output display screen 5 are especially, but not exclusively, designed for use in a tunnelling shield of 10.5 meters diameter which is propelled by 40 rams distributed at uniformly spaced positions around the circumference of the shield. The lowermost thirteen rams of the shield—generally referred to as the propelling rams—are in normal circumstances permanently engaged, unless there is such a large upward deviation in the direction of advance of the shield as to cause the beam to be deflected upwards to a sufficient extent to cause light to be emitted at the hole 11 on the display screen 5. Eight rams on the right-hand side of the shield are referred to as the "turn left rams" and eight rams on the left-hand side of the shield are referred to as the "turn right rams". The remaining eleven rams at the top of the shield are known as the "elevation rams".

It will be apparent that the further an illuminated sub-group of fibres on the display screen 5 is from the central vertical axis 9 the greater the correction that must be applied on that side of the shield. The display screen 5 may carry, adjacent each vertical axis, an indication as to the number of rams to be engaged at the right or left-hand side of the shield to correct for any recorded left or right-hand lead. The nett amount of lead correction will be the difference between the readings on the left and right-hand sides of the display screen. The horizontal lines on the display screen 5 may be marked with plumb data such as the amount of look-up or overhang required to tilt the shield for the correct gradient.

Figure 5:
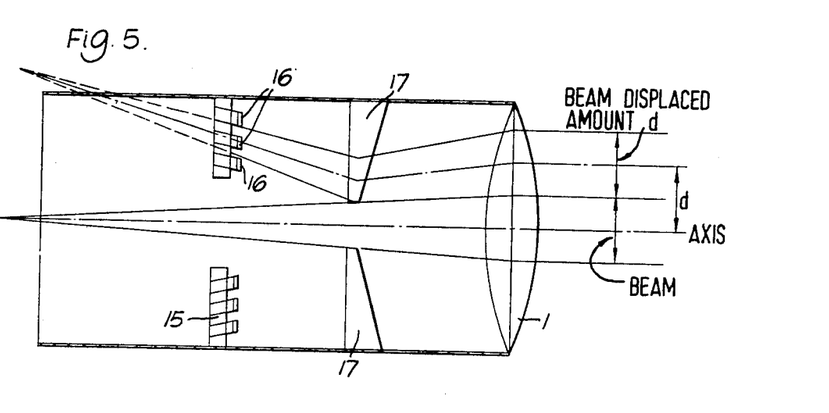
FIG. 5 is a diagrammatic representation of the preferred method of monitoring for off-line and off-level motion of a tunnelling shield.

The method and apparatus described so far is concerned with detecting and correcting for angular deflection in the direction of motion of a tunnelling shield from a predetermined path, sometimes referred to as the "attitude" of the tunnelling shield. FIG. 5 illustrates diagrammatically the preferred method of detecting and correcting for off-line and off-level motion of a tunnelling shield, that is to say where the attitude of the tunnelling shield is correct but the motion of the tunnelling shield is displaced from and parallel to the predetermined path. In this method, an annular disc 15 is positioned between lens 1 and lens 2, and, during normal monitoring of the motion of the tunnelling shield, the beam of collimated light refracted by the lens 1 passes through the central aperture of the annular disc on to the lens 2. The annular disc 15 carries twelve phototransistors 16 arranged with their axes lying in three concentric circles of four uniformly spaced phototransistors, the phototransistors on each circle lying on the horizontally and vertically disposed diameters of the annular disc. The phototransistors 16 on each of these diameters of the annular disc 15 are connected to an associated comparator circuit whose output is fed to one of two indicating instruments. Two wedge prisms 17 are mounted between the lens 1 and the annular disc 15 on a ring bearing (not shown) driven by an electric motor. If the beam of collimated light is parallel to the predetermined path but is displaced from its correct axis due to off-line and/or off-level deviation of the tunnelling shield, when the wedge prisms 17 are driven in rotation about the axis of the lens 1, they will interrupt the refracted beam at intervals and deflect it on to the phototransistors 16 carried by the annular disc 15. The comparator circuits associated with the phototransistors 16 on each diameter of the disc 15 amplify and compare the voltage inputs from the phototransistors on opposite sides of the disc and the nett output is fed to the associated indicating instrument from which an operative can determine the transverse displacement that must be made to input end matrix 4 to compensate for the off-line and/or off-level movement of the shield.

Figures 6, 7:
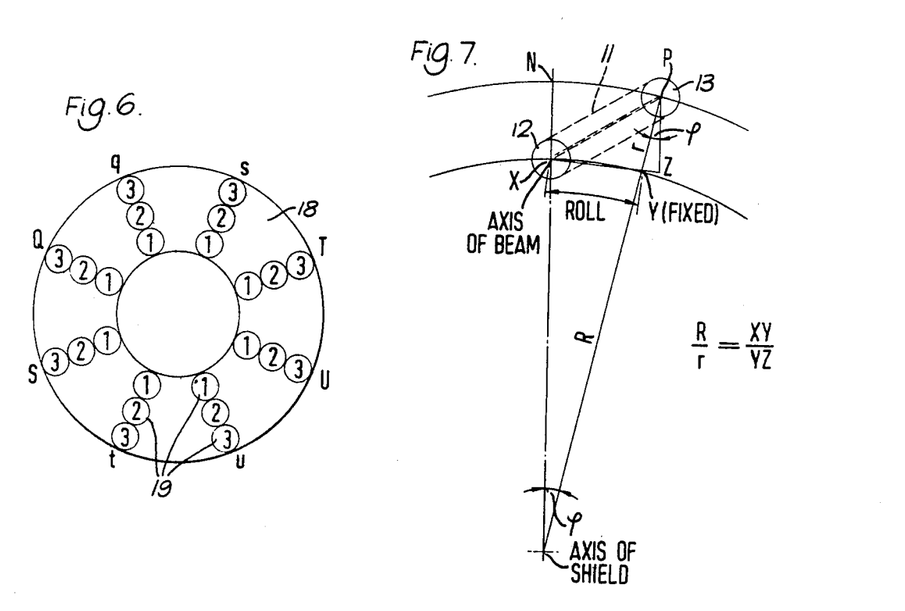
FIG. 6 is a diagrammatic representation of apparatus employed in an alternative method of monitoring for off-line and off-level motion of a tunnelling shield.
FIG. 7 is a diagrammatic representation of the preferred method of monitoring and compensating for roll of a tunnelling shield.

In an alternative method of monitoring at intervals for off-line and off-level movement of the tunnelling shield in a direction parallel to the predetermined path, an annular diaphragm 18, shown in FIG. 6, which carries the input ends of a plurality of optical guides 19, is positioned between the lens 1 and the lens 2. The input ends of the optical guides 19 on the diaphragm 18 are arranged in a number of concentric circles around the central aperture of the diaphragm, the input ends lying on a number of radially extending rows. Rows QSTU monitor for off-line movement of the shield and rows qstu monitor for off-level movement of the shield. Should a shield be off-line then the beam will, say, overlie the input ends 1 and 2 in each of rows Q and S and will not overlie any input ends in rows T and U. The optical guides 19 in rows QSTU are connected through phototransistors to a bridge circuit feeding an associated indicating instrument. The beam overlying the input ends 1 and 2 in rows Q and S will cause a deflection of the indicating instrument and the extent of this deflection will enable an operative to assess the distance to move the input end matrix 4 to compensate for the off-line movement of the shield. The optical guides 19 in rows qstu employed to monitor for off-level movement of the shield are connected through phototransistors to a second bridge circuit feeding a second indicating instrument so that the operative can also assess the distance to move the input end matrix 4 to compensate for off-level movement of the shield.

In the methods shown in both FIG. 5 and FIG. 6, when the direction of motion of the tunnelling shield is monitored for off-line and off-level movement the deflection of the indicating instrument or instruments may be such that the transverse displacement of the input end matrix effected to compensate for off-line and/or off-level movement of the shield can be reduced. Eventually when the direction of motion is monitored and the indicating instrument or instruments show no deflection, the input end matrix will have returned to its original position.

As has been previously mentioned, it is preferred to monitor and compensate for roll of the tunnelling shield and FIG. 7 illustrates diagrammatically the preferred method employed for this purpose. In this arrangement, the beam of collimated light is directed on to the input end of the group of optical guides by means of an extensible periscope 11 whose inlet end 12 lies on the axis of the beam and which can be rotatably adjusted about the axis of its outlet end 13. In normal operation of the apparatus, the beam of collimated light enters the extensible periscope 11 at its inlet end 12, is deflected in the normal way through 90° and is deflected again through 90° at the outlet end 13 of the periscope so that the beam is directed on to the input end of the group of optical guides. Since the apparatus incorporating the input end of the group of optical guides and the associated lens assembly is carried by the tunnelling shield, in the event that the tunnelling shield rolls about its axis through an angle $\phi$, the axis of the apparatus (and of the outlet end 13 of the periscope 11) will move from point N to point P. In order to compensate for such roll the extensible periscope 11 must be rotated about the axis of its outlet end 13 in such a direction as to retain or restore the inlet end 12 of the periscope on the axis of the beam of collimated light and in order to achieve this object it is necessary to arrange for the ratio $(R/r)=(XY/YZ)$ to be satisfied, where R is the radial distance between the axis of the shield and the axis of the beam, r is the radial distance between the axis of the beam and the axis of the apparatus, point Y is fixed with respect to the axis of the apparatus and the line PZ is arranged to be parallel to the vertical plane containing the axes of the shield and of the beam of collimated light. This ratio is satisfied by arranging for the points X and Z each to move in a straight line an appropriate distance from the point Y.

The preferred apparatus for carrying out the method of the invention is shown in FIGS. 8 to 12. The apparatus comprises a tubular housing 20, of substantially square cross-section which, in use, is rigidly mounted on a tunnelling shield with its axis substantially parallel to the axis of the shield. The housing 20 is 400 mm long and each of its sides is 110 mm wide. Protruding through one end wall of the housing 20 is a lens assembly 23, similar to that shown in FIG. 1, consisting of a convex lens 21 and a concave lens 22. An extensible periscope assembly 24 is mounted on the inlet end of the lens assembly 23 in such a way that the periscope assembly can be rotatably adjusted about the axis of the lens assembly.

Figure 8:
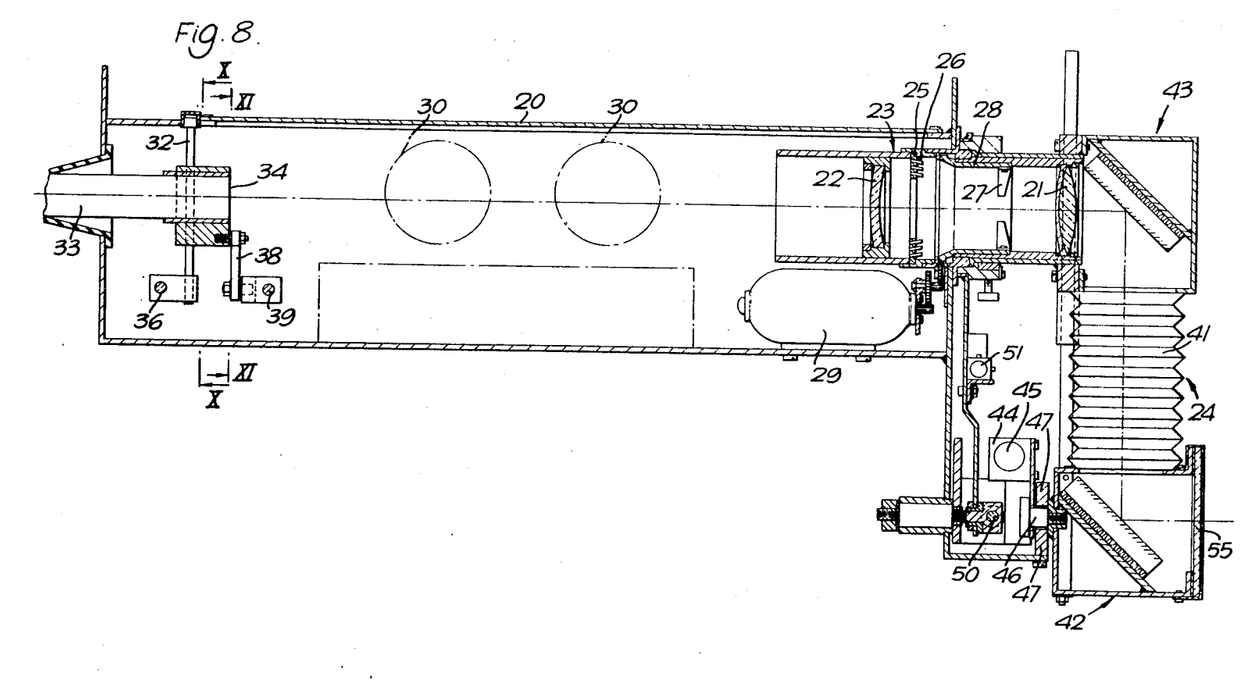
FIG. 8 is a sectional side view of the preferred apparatus for carrying out the methods diagrammatically represented in FIGS. 1 to 5 and 7.
Figure 9:
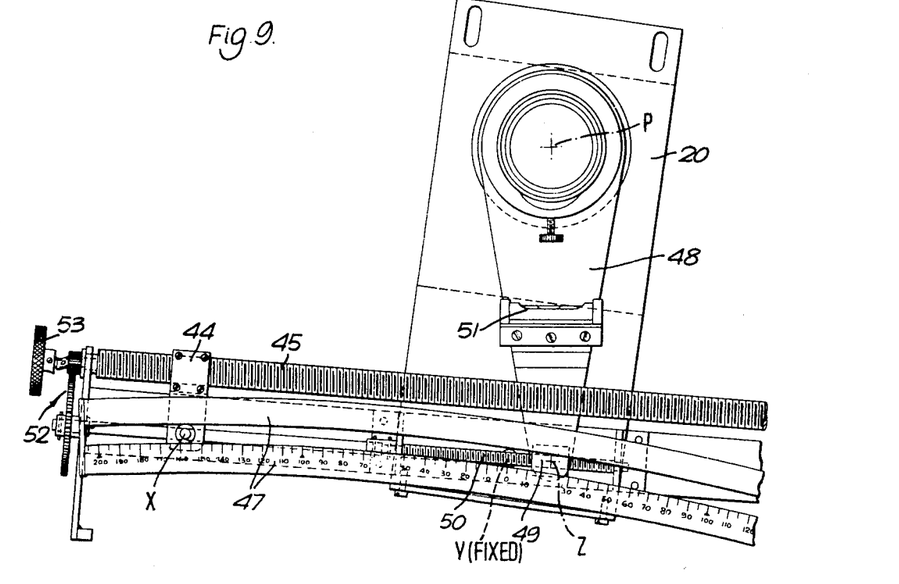
FIG. 9 is an end view of the apparatus shown in FIG. 8.
Figure 10:
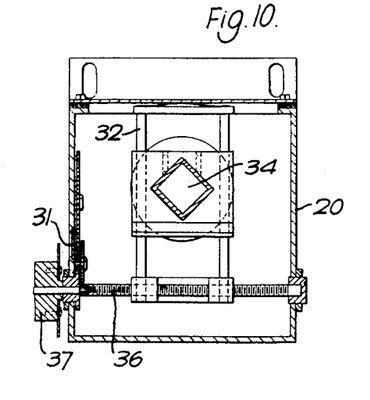
FIGS. 10 and 11, respectively, are cross-sectional views taken on the lines $\overline{X—X}$ and $\overline{XI—XI}$ in FIG. 8.
Figure 11:
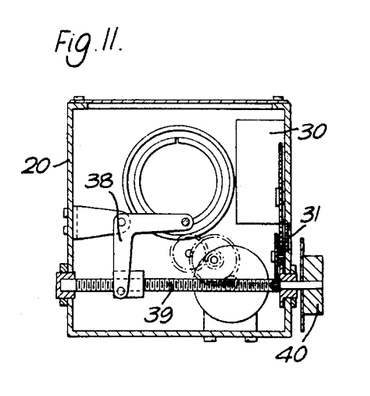

Mounted in the lens assembly 23 between the lens 21 and the lens 22 is an arrangement, similar to that shown in FIG. 5, for monitoring for off-line and off-level motion of the tunnelling shield. This arrangement consists of an annular disc 25, which supports twelve phototransistors 26, and two diametrically opposed wedge prisms 27 which are carried by a ring 28 that can be rotatably driven about the axis of the lens assembly 23, through appropriate gearing, by an electric motor 29. Each of the two sets of phototransistors carried by the annular disc 25 is connected to an associated comparator circuit which feeds one of two indicating instruments 30 whose dials are visible through windows 31 in a side wall of the housing 20.

Mounted in the housing 20, adjacent the end remote from the lens assembly 23, on an adjustable frame 32, is an input end matrix 34, similar to that shown in FIG. 3, from which an optical cable 33 extends to an outlet display screen (not shown), similar to that shown in FIG. 4. The frame 32 is mounted on a horizontally extending screw threaded rod 36 (FIG. 10) and appropriate adjustment of the position of the input end matrix 34 in a horizontal direction, to compensate for off-line movement of the shield, can be effected by means of an operating knob 37 in accordance with the reading of the associated indicating instrument 30. The frame 32 is also connected through a linkage mechanism 38 to a second horizontally extending screw threaded rod 39 (FIG. 11) and appropriate adjustment of the position of the input end matrix 34 in a vertical direction to compensate for off-level movement of the shield, can be effected by means of an operating knob 40 in accordance with the reading of the other indicating instrument 30.

The periscope assembly 24 comprises an extensible periscope 41 whose outlet end 43 is connected to the inlet end of the lens assembly 23 in such a way that the periscope can be pivoted about the axis of the lens assembly. The inlet end 42 of the extensible periscope 41 is pivotally secured to a bracket 44 (point X of FIG. 7) which is in screw threaded engagement with a transversely extending screw-threaded rod 45, by means of a screw 46. When the periscope is caused to pivot about the axis of the lens system 23, the screw 46 is constrained to move in an arcuate path between two guide rails 47 which are fixed with respect to the housing 20, and, hence, with respect to the tunnelling shield. Also secured at the inlet end of the lens assembly 23 in such a way as to pivot about the axis of the lens system (point P of FIG. 7) is an arm 48 which, at its lower end, is pivotally connected to a bracket 49 (point Z of FIG. 7) in screw-threaded engagement with a second screw-threaded rod 50 which extends parallel to the rod 45. The arm 48 carries a spirit level 51 so that an operative can readily assess when the arm has been pivoted about the axis of the lens assembly 23 to a position in which it is substantially vertical. The screw threaded rods 45 and 50 are coupled together by a gear mechanism 52, the gear mechanism and the screw threads of the rods being such that, in the event of roll of the tunnelling shield about its axis, when operating knob 53 is adjusted to rotate the arm 48 so that it lies substantially vertical the brackets 44 and 49 move to positions to satisfy the ratio (R/r)=(XY/YZ). Thus, even if a tunnelling shield should roll about its axis, provided that the arm 48 is maintained vertical, the beam of collimated light will always be directed on to the inlet end 42 of the periscope 41 and, hence, will always be reflected on to the input end matrix 34.

Figure 12:
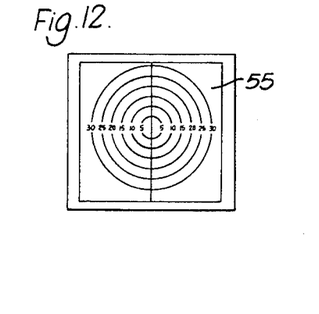
FIG. 12 is a front view of the intercepting screen of the apparatus shown in FIGS. 8 to 11.

The inlet end 42 of the periscope 41 may carry a transparent screen 55, shown in FIG. 12, which can serve as a readily accessible visual monitor to indicate whether or not the tunnelling screen is moving off-line and/or off-level and whether or not operation of the arrangement shown in FIG. 5 or FIG. 6 is necessary to monitor and compensate for such off-line and/or off-level movement of the shield.

The method of the present invention has the improved advantage that it provides for continuous determination of corrections to be applied to the motion of a tunnelling shield as hereinbefore defined so that motion of the shield can be maintained along a predetermined path as soon as any deviation from the path is detected.

What I claim as my invention is:

1. A method of determining corrections to be applied to the motion of a tunnelling shield to maintain or restore motion of the shield along a predetermined path, which method comprises directing a beam of collimated light along, or in a direction parallel to or at a fixed angle with, the axis of the predetermined path of the tunnelling shield; focussing said beam on to the input end of an optical cable carried by the shield and comprising a plurality of optical fibres, the input ends of said optical fibres being arranged in an array in which the position of the input end of each optical fibre relative to that of another is fixed; and displaying light transmitted through the optical fibres on to a device at which the output ends of the optical fibres are so arranged as to facilitate ready determination of any correction required to be applied to the motion of the tunnelling shield to maintain or restore motion of the tunnelling shield along said predetermined path.

2. A method of determining corrections to be applied to the motion of a tunnelling shield propelled by a plurality of rams to maintain or restore motion of the shield along a predetermined path, which method comprises directing a beam of collimated light along, or in a direction parallel to or at a fixed angle with, the axis of the predetermined path of the tunnelling shield; focussing said beam on to the input end of an optical cable carried by the shield and comprising a plurality of optical fibres, the input ends of said optical fibres being arranged in an array in which the position of the input end of each optical fiber relative to that of another is fixed; and displaying light transmitted through the optical fibres on to a device at which the output ends of the optical fibres are so arranged as to facilitate ready identification of the particular ram or rams to be or not to be operated, whereby any correction required to be applied to the motion of the tunnelling shield to maintain or restore motion of the tunnelling shield along said predetermined path can be readily determined.

3. A method of determining corrections to be applied to the motion of a tunnelling shield propelled by a plurality of rams to maintain or restore motion of the shield along a predetermined path, which method comprises directing a beam of collimated light along, or in a direction parallel to or at a fixed angle with, the axis of the predetermined path of the tunnelling shield; focussing said beam on to the input end of an optical cable carried by the shield and comprising a plurality of optical fibres, the input ends of said optical fibres being arranged in an array in which the position of the input end of each optical fibre relative to that of another is fixed; and displaying light transmitted through some of the optical fibres on to a screen at which the input ends of the optical fibres are mutually spaced in an array of separate sub-groups, each identified to correspond to at least one particular ram, any deviation in the beam focussed on the input end of the group to such an extent that some optical fibres no longer transmit light and other optical fibres that were not transmitting light now do so, being displayed on the screen with the sub-group or sub-groups of the output ends of those optical fibres transmitting light indicating which ram or rams should be operated at the next step in the advance of the tunnelling shield and with the sub-group or sub-groups of the output ends of those optical fibres not transmitting light indicating which ram or rams should not be operated at the next step in the advance of the shield.

4. A method of determining corrections to be applied to the motion of a tunnelling shield to maintain or restore motion of the shield along a predetermined path, which method comprises directing a beam of collimated light along, or in a direction parallel to or at a fixed angle with, the axis of the predetermined path of the tunnelling shield; focussing said beam on to the input end of an optical cable carried by the shield and comprising a plurality of optical fibres, the input ends of said optical fibres being arranged in an array in which the position of the input end of each optical fibre relative to that of another is fixed; and displaying light transmitted through the optical fibres on to a device at which the output ends of the optical fibres are so arranged as to form a magnification of the array of the input ends, whereby the axis of the beam of collimated light entering the input ends of the group of optical fibres constitutes a datum and any correction required to be applied to the motion of the tunnelling shield to maintain or restore motion of the tunnelling shield along said predetermined path can be readily determined from the direction and extent the light transmitted to the display device has deviated from the corresponding datum of the magnified array of the output ends.

5. A method as claimed in claim 1, wherein the direction of motion of the tunnelling shield is also monitored during the advance of the shield for off-line and off-level movement of the shield in a direction parallel to the predetermined path, whereby any transverse displacement required to be applied to the input end of the optical cable to compensate for off-line and off-level movement of the shield can be readily determined.

6. A method as claimed in claim 5, wherein monitoring for off-line and off-level movement of the shield is effected by causing the beam of collimated light to impinge upon a plurality of optical devices which are arranged in such an array as to detect any off-line and off-level movement of the shield and which are connected through at least one circuit to at least one indicating instrument from which can be assessed the extent of off-line and off-level movement of the shield and hence the transverse displacement that must be made to the input end of the optical cable to compensate for such off-line and off-level movement.

7. A method as claimed in claim 6, wherein the beam of collimated light is deflected at periodic intervals on to the array of optical devices for detection of off-line and off-level movement of the shield.

8. A method as claimed in claim 1, wherein the motion of the tunnelling shield is also monitored for roll about the axis of the shield and, in the event that roll of the tunnelling shield is detected, the beam of collimated light directed on to the input end of the optical cable is moved on appropriate angle about the axis of the shield to compensate for said roll.

9. A method of determining corrections to be applied to the motion of a tunnelling shield to maintain or restore motion of a shield along a predetermined path, which method comprises directing a beam of collimated light along, or in a direction parallel to or at a fixed angle with, the axis of the predetermined path of the tunnelling shield; focussing said beam on to the input end of an optical cable carried by the shield and comprising a plurality of optical fibres, the input ends of said optical fibres being arranged in an array in which the position of the input end of each optical fibre relative to that of another is fixed; displaying light transmitted through the optical fibres on to a device at which the output ends of the optical fibres are so arranged as to facilitate ready determination of any correction required to be applied to the motion of the tunnelling shield to maintain or restore motion of the tunnelling shield along said predetermined path, monitoring the motion of the tunnelling shield for roll about the axis of the shield and, in the event that roll of the tunnelling shield is detected, the beam of collimated light directed on to the input end of the group of optical fibres is moved an appropriate angle about the axis of the shield to compensate for said roll, said beam of collimated light being directed on to the input end of the group of optical fibres by means of an extensible periscope whose inlet end lies on the axis of the beam and which can be rotatably adjusted about the axis of its outlet end, the arrangement being such that, when the tunnelling shield rolls in one direction, the periscope can be rotatably adjusted about the axis of its outlet end in such a direction and to such an extent that the axes of the inlet end of the periscope and of the beam of collimated light coincide.

10. A method as claimed in claim 2, wherein operation of the rams at each step in the advance of the shield is effected automatically from signals initiated by the optical fibres transmitting light to the display screen.

11. A method as claimed in claim 1, wherein the beam of collimated light is a laser beam.

12. A tunnelling shield on which is mounted apparatus for determining corrections to be applied to the motion of the tunnelling shield to maintain or restore said motion along a predetermined path, which apparatus comprises an optical cable carried by the tunnelling shield and comprising a plurality of optical fibres, the input ends of said fibres being arranged in an array in which the position of the input end of each optical fibre relative to that of another is fixed; a lens system for focussing a beam of collimated light on to the input end of the optical cable, the axis of the lens system extending parallel to, or at a fixed angle with, the axis of the tunnelling shield; and a display device at which the output ends of the optical fibres are so arranged that any correction required to be applied to the motion of the tunnelling shield to maintain or restore motion of the shield along said predetermined path can be readily determined from the light displayed at the display device.

13. A tunnelling shield which is propelled by a plurality of rams and on which is mounted apparatus for determining corrections to be applied to the motion of the tunnelling shield to maintain or restore said motion along a predetermined path, which apparatus comprises an optical cable carried by the tunnelling shield and comprising a plurality of optical fibres, the input ends of said fibres being arranged in an array in which the position of the input end of each optical fibre relative to that of another is fixed; a lens system for focussing a beam of collimated light on to the input end of the optical cable, the axis of the lens system extending parallel to, or at a fixed angle with, the axis of the tunnelling shield; and a display device at which the output ends of the optical fibres are so arranged as to facilitate ready identification of a particular ram or rams to be or not to be operated, the arrangement being such that any correction required to be applied to the motion of the tunnelling shield to maintain or restore motion of the shield along said predetermined path can be readily determined from the light displayed at the display screen or other device.

14. A tunnelling shield which is propelled by a plurality of rams and on which is mounted apparatus for determining corrections to be applied to the motion of the tunnelling shield to maintain or restore said motion along a predetermined path, which apparatus comprises an optical cable carried by the tunnelling shield and comprising a plurality of optical fibres, the input ends of said fibres being arranged in an array in which the position of the input end of each optical fibre relative to that of another is fixed; a lens system for focussing a beam of collimated light on to the input end of the optical cable, the axis of the lens system extending parallel to, or at a fixed angle with, the axis of the tunnelling shield; and a display at which the output ends of the optical fibres are arranged in a plurality of separate sub-groups mutually spaced in an array such that each sub-group is identified to correspond to a particular ram or rams, the arrangement being such that should the beam of collimated light focussed on the input end of the optical cable deviate to such an extent that some optical fibres no longer transmit light and other optical fibres that were not transmitting light now do so, then the mutually spaced sub-groups of the output ends of the optical fibres transmitting light to the screen will indicate which ram or rams should be operated for the next step in the advance of the shield and the sub-groups of the output ends of the optical fibres not transmitting light to the screen will indicate which ram or rams should not be operated in the next step in the advance of the shield.

15. A tunnelling shield on which is mounted apparatus for determining corrections to be applied to the motion of the tunnelling shield to maintain or restore said motion along a predetermined path, which apparatus comprises an optical cable carried by the tunnelling shield and comprising a plurality of optical fibres, the input ends of said fibres being arranged in an array in which the position of the input end of each optical fibre relative to that of another is fixed; a lens system for focussing a beam of collimated light on the input end of the optical cable, the axis of the lens system extending parallel to, or at a fixed angle with, the axis of the tunnelling shield; and a display device at which the output ends of the optical fibres are so arranged as to form a magnification of the array of the input ends, the arrangement being such that any correction required to be applied to the motion of the tunnelling shield to maintain or restore motion of the shield along said predetermined path can be readily determined from the light displayed at the display device.

16. A tunnelling shield as claimed in claim 15, wherein the input ends of the optical fibres are arranged in the form of a matrix comprising two sets of rows of input ends, the axes of one set of rows being perpendicular to the axes of the other set of rows.

17. A tunnelling shield as claimed in claim 16, wherein one set of rows extends horizontally with the datum lying at the centre of the matrix.

18. A tunnelling shield as claimed in claim 12, wherein the lens system comprises two lenses, the first of which has at least one convex face and the second of which has at least one concave face, the focal length of the lens system being greater than the distance between the first lens and the focal point of the lens system.

19. A tunnelling shield as claimed in claim 12, wherein the input end of the group of optical fibres is so supported that the position of the input end relative to the axis of the lens system in a plane normal to said axis can be adjusted.

20. A tunnelling shield as claimed in claim 12, wherein a plurality of optical devices is incorporated in the lens system and the optical devices are arranged in such a way that they will detect any off-line and off-level movement of the shield, the optical devices being connected to at least one circuit feeding at least one indicating instrument from which can be assessed the extent of off-line and off-level movement of the shield and hence the transverse displacement that must be made to the input end of the optical cable to compensate for any such off-line and off-level movement.

21. A tunnelling shield as claimed in claim 20, wherein a prism system, which can be rotatably driven about the axis of the lens system, is incorporated in the lens system to refract the beam of collimated light at intervals on to optical devices of said plurality of optical devices.

22. A tunnelling shield as claimed in claim 12, wherein the outlet end of an extensible periscope is secured to the inlet end of the lens system in such a way that the periscope can be pivotally adjusted about the axis of the lens system and means is provided for pivotally adjusting the periscope about the axis of the lens system the angular displacement necessary to compensate for roll of the tunnelling shield about its axis.

* * * * *

UNITED STATES PATENT AND TRADEMARK OFFICE
CERTIFICATE OF CORRECTION

PATENT NO. : 4,273,468
DATED : June 16, 1981
INVENTOR(S) : Tadeusz R. Cyfka

It is certified that error appears in the above-identified patent and that said Letters Patent are hereby corrected as shown below:

In the Abstract, line 10, "guide" should be --fibre--.

In the Abstract, line 11, "or guides" should be deleted.

In the Abstract, line 12, "guides" should be --fibres--.

Column 2, the last line should read --shield, the beam being as high as possible in the tunnel.--

Claim 2, column 10, line 20, "fiber" should read --fibre--.

Claim 8, column 11, line 42, "on" should be --an--.

Signed and Sealed this

Fourteenth Day of June 1983

[SEAL]

Attest:

DONALD J. QUIGG

Attesting Officer

Acting Commissioner of Patents and Trademarks